United States Patent [19]

Voss et al.

[11] Patent Number: 5,308,810

[45] Date of Patent: May 3, 1994

[54] METHOD FOR TREATING CONTAMINATED CATALYST

[75] Inventors: Andrew P. Voss, Cerritos; William Murray, Orange; Ruthjean Stager, Fullerton, all of Calif.

[73] Assignee: Atlantic Richfield Company, Los Angeles, Calif.

[21] Appl. No.: 997,483

[22] Filed: Dec. 28, 1992

[51] Int. Cl.⁵ .................... B01J 38/62; B01J 23/22; C01B 21/00
[52] U.S. Cl. .................. 502/28; 60/39.182; 60/39.52; 423/239.1; 502/25; 502/26; 502/325; 502/353; 502/516; 502/521
[58] Field of Search .............. 502/25, 26, 28, 38, 502/516, 521

[56] References Cited

U.S. PATENT DOCUMENTS 4,572,110  2/1986  Haefich ..................... 60/39.182
4,615,991  10/1986  Obayashi et al. .............. 502/28

FOREIGN PATENT DOCUMENTS 0505881  9/1992  European Pat. Off. .......... 502/38

OTHER PUBLICATIONS

Kraus, H. J., and R. P. Kejariwal, "Integrating a Cogeneration Plant into a Refinery", *Energy Process* (vol. 8, No. 3), Sep. 1988.
Radin, M. G. and B. Boyles, "Turbine Exhaust Gas DeNOx Using Selective Catalytic Reduction", Presented to American Power Conference, Apr. 27–29, 1987.
Davis, J. S. and G. C. Duponteil, "Using SCR for NOx Control Affects HRSG Design", Operation, *Power*, Oct. 1986.

*Primary Examiner*—Paul E. Konopka
*Attorney, Agent, or Firm*—Tom F. Pruitt

[57] ABSTRACT

A method of treating spent selective catalytic reduction (SCR) catalyst is provided, which method comprises contacting the spent catalyst with a solution comprising a SCR catalyst metal salt, preferably a vanadium salt, and heating the catalyst contacted with the metal salt solution at a calcination temperature in the presence of oxygen. Preferably, after treatment with the metal salt solution, the catalyst is dried with air for at least about 10 seconds and heated to a temperature in the range of about 130° F. to about 170° F. for a period of about 30 minutes to about 90 minutes before heating to the calcination temperature. In addition, a method is provided for restoring the catalytic activity of a SCR catalyst, contaminated with platinum, to enhance catalytic reduction of oxides of nitrogen to nitrogen by the SCR catalyst, said method comprising (a) contacting the spent catalyst with a metal salt containing solution; (b) then heating the catalyst in the presence of oxygen to a calcination temperature at which the metal salt is decomposed to form an oxide of the metal and the metal oxide is bonded to the catalyst support, to form a calcined catalyst; and, (c.) contacting the calcined catalyst with a SCR flue gas stream at a temperature in the range of about 450° F. to about 750° F. Calcination temperatures as low as 250° F. are effective to restore SCR catalyst activity.

26 Claims, 2 Drawing Sheets

METHOD FOR TREATING CONTAMINATED CATALYST

BACKGROUND OF THE INVENTION

1. Field of the Invention

In one aspect, this invention relates to a method of treating spent catalyst. In another aspect, this invention relates to a method of increasing the desired activity of catalyst contaminated with an undesired metal which augments the rate of an undesired reaction. In still another aspect, this invention relates to enhancement of the catalytic reduction of oxides of nitrogen to nitrogen by enhancing the performance of catalyst contaminated with platinum.

2. Description of the Related Art

Cogeneration is broadly applicable to industrial as well as some non-industrial activities, wherever electricity and thermal energy are utilized. In particular, cogeneration offers improved energy utilization to refiners and reduced overall energy costs through the on-site production of electricity and thermal energy in the form of steam from one or more refinery-produced fuel sources. In addition, by on-site generation and consumption of energy, cogeneration benefits the environment by reduced flaring of refinery fuel gases and more efficient refinery fuel balancing, as well as reduction of transmission and distribution related energy losses. Cogeneration overall uses less input fuel than separate equivalent steam generation and power generation.

Air-quality regulations, however, impose limitations on cogeneration facilities, as authorized air pollution control agencies dictate emissions limits for each unit. Before approval is granted for permits for authority to construct and permits for authority to operate cogeneration facilities, these agencies will review and must approve process and equipment technology for control of cogeneration plant air emissions and will set emissions limits for each unit.

Cogeneration units vary in their configuration but usually include one or more combustion turbine generators upstream of one or more heat recovery steam generators. Typical heat recovery steam generators include one or more duct burners, steam superheaters, high and medium pressure steam evaporators or economizers and, for control of emissions, one or more catalytic oxidizer systems for oxidation of carbon monoxide and unburned fuels, and, in addition, an ammonia injection grid and selective catalytic reduction (SCR) catalyst system for control of emissions of oxides of nitrogen, and a discharge stack.

For reasons of process economics and operational flexibility, commercial cogeneration units are frequently designed to operate at a base load with a variety of fuels. Many commercial units are designed so that the gas turbines and the duct burners of the heat recovery steam generator can burn natural gas or liquified petroleum gas containing butane as separate primary fuels, or various mixtures of natural gas and butane can be burned as a primary fuel.

Consumption of on-site refinery-produced butanes in a cogeneration facility is generally economical and helps to avoid the necessity to flare excess refinery-produced butanes. Butane also serves as a standby cogeneration fuel which replaces lower cost natural gas when natural gas supplies become limited or become unavailable, such as in the event of a natural disaster impacting natural gas availability. Also, in order to be able to effect a fuel switch from natural gas to butane quickly, as in the event of a natural gas supply emergency, many cogeneration plants burn some butane at all times. This helps assure the reliability of the facility. Butane is also burned to help the refinery maintain a butane balance, especially in warmer weather. In warmer weather, butane tends to be more readily available because of restrictive vapor pressure requirements on gasoline fuel products, as adding excessive amounts of relatively light butane to a gasoline blend may cause the vapor pressure of the blend to exceed regulatory limits. Refinery-produced butanes which are not ultra-purified, however, may contain low-level contaminates such as sulfur-containing compounds such as hydrogen sulfide, mercaptans, carbonyl sulfide, sulfur dioxide, and others, and may also contain small amounts of higher and lower boiling hydrocarbons.

Many commercial refinery cogeneration units are also designed to burn a third gas, refinery fuel gas or waste gas as a fuel; however, such refinery fuel gases contain a much broader boiling range of hydrocarbons than a refinery-produced butane stream and may also contain relatively higher concentrations of contaminants. There is a strong economic incentive to burn refinery fuel gas. Because of availability considerations, refinery fuel gas is usually not burned alone but is mixed for burning with either or both of the primary fuels. Refinery produced fuel gas can be used as gas turbine fuel or can be used as fuel for the heat recovery stream generator duct burners.

Typically, the amount of refinery fuel gas burned as cogeneration unit fuel depends on availability of waste gas from the refinery and depends on limitations upon total emissions from the unit to which emissions of the burned refinery waste gas contributes, or, if the cogeneration facility cannot consume all of the available waste gas, the excess must be flared. Flaring wastes the energy value available in this gas and also creates additional, and possibly untreated, emissions to the atmosphere. It is thus important to consume as much excess refinery fuel gas at a cogeneration facility as is practical.

Cogeneration units, including the emissions controls, are designed against a specification based upon the applicable local regulatory limit on carbon monoxide/reactive organic gases (CO/ROG) and oxides of nitrogen (NOx) emissions. The reactive organic gases are typically unburned or partially burned fuel. These emissions-related design specifications assume an effective CO/ROG conversion catalyst to oxidize and convert CO to $CO_2$ and ROG to carbon dioxide ($CO_2$) and water and an effective deNOx catalyst to convert NOx to nitrogen and water. The emissions control design considerations also generally assume use of natural gas, butane and refinery waste gas as three available fuels in base load operation of gas turbine generators.

The NOx formed from the combustion of hydrocarbon fuels are principally nitric oxide (NO) and nitrogen dioxide ($NO_2$). The amount of NOx formed typically depends upon the nitrogen content of the fuel and the combustion temperature. The formation of NO from combustion air does not take place by the simple combination of nitrogen and oxygen but occurs through inter-related, reversible reactions involving atomic oxygen, atomic nitrogen and hydroxyl radicals.

Most refinery configured cogeneration units employ at least one heat recovery steam generator. A typical heat recovery steam generator includes an air pollution control system consisting of a precious metal catalyst for oxidation of CO/ROG upstream of a separate catalytic NOx removal system. Turbine exhausts consist of low levels of CO and unburned hydrocarbons that represent partially burned or unburned fuel. In addition, steam or water is often injected directly into the combustion chamber of the gas turbine to reduce NOx by lowering flame temperature; however, such may result in higher CO in the turbine exhaust gas.

Cogeneration units use oxidation catalyst technology for CO and ROG emission reduction as part of the units' overall emission control technology. Oxidation catalysts remove only CO and ROG, leaving NOx unchanged. This oxidation catalyst technology is highly developed because of extensive application, since about 1974, in vehicle exhaust system catalytic converters. Commercial prior art automotive catalysts use platinum as a primary component, but there has been some laboratory testing of formulations using other precious metals such as palladium and rhodium. For stationary sources, such as cogeneration units, prior art catalyst formulations contain a mixture of platinum and rhodium, or platinum and palladium. To promote a high rate of gas contact with the catalyst surface, the catalyst is designed to be coated on or supported by a monolithic or honeycomb structure, consisting of many small parallel cells and composed of a ceramic material, much the same as is used in automotive applications. The catalyst can also be supported on metallic substrates such as stainless steel. Oxidation catalyst activity will deteriorate if exposed to high temperatures or if the active sites are poisoned by contaminants such as phosphorus or lead. For a cogeneration unit which burns butane and/or refinery gases having low-level contaminants, including sulfur compounds, catalyst design and operating conditions for good conversion, avoidance of production of sulfates and extended catalyst life are critically important.

Cogeneration units also use selective catalytic reduction (SCR) systems for NOx reduction (deNOx) as part of the units' overall emission control technology. The term "deNOx", as used in the specification and claims, means reduction of oxides of nitrogen. Prior art NOx reduction catalyst formulations include vanadium oxides, titanium oxides and other metallic oxide catalysts and are generally effective for the selective reduction of nitrogen oxides with added ammonia urea, and the like, to form nitrogen and water and are formulated and selected to not oxidize ammonia to form nitrogen oxide. The NOx removal efficiency is principally impacted by activity of the deNOx catalyst, catalyst volume, flue gas temperature and NH3/NOx mole ratio. The deNOx catalyst can oxidize $SO_2$ in the flue gases to $SO_3$, which can react with excess ammonia to form ammonium bisulfate or ammonium sulphate, which can cause undesirable corrosion and fouling of boiler surfaces.

In addition to the active metal, the SCR catalyst system comprises a support. The support provides a physical base or substructure upon which the catalyst can be dispersed and further provides a relatively large contact surface area for contact between catalyst and the gaseous stream to be treated. Large commercial supports are monoliths, where the active metals are deposited in a relatively thin layer of high surface area natural or synthetic alumina which is laminated on a screen-like metallic mesh or ceramic substrate during the catalyst manufacturing process. Typically, SCR catalyst is in the form of parallel panels comprising a metallic mesh substrate coated with a support which holds the active metal, or these catalyst structures are formed into plates forming a honeycomb-type structure to provide channels for parallel gas flow with relatively low pressure drop. SCR catalyst is also commercially available in the form of pellets, wherein the support provides the substratum for catalyst deposited on the pellets.

During unit operations, an unexpected and rapid loss of SCR system NOx removal performance can be experienced. When SCR systems have a premature loss of NOx conversion efficiency, the SCR catalyst cannot easily be regenerated as there are technical problems associated with restoration of the SCR deNOx efficiency, and replacement of the catalyst is expensive. Some loss of performance and certain reasons for loss of performance have been explained. For example, it is known in the prior art that exposure of a catalyst, having good deNOx efficiency, to a moist environment will cause the NOx removal efficiency to drop significantly and will cause that catalyst to increase oxidation of ammonia to nitrogen oxide. In addition, it is known that SCR deNOx catalyst performance may be adversely affected by catalyst aging, and that after four to five or more years of operations, catalyst deNOx efficiency is expected to diminish; however, catalyst deNOx removal efficiency is expected to be in the range of about 90% or greater after a three period, depending on the design, space velocity, loading factors and the like.

In some instances, relatively new catalyst, e.g. less than one year old, can be impacted in a manner which significantly reduces NOx removal efficiency—a condition that would not otherwise be expected unless contaminated with moisture or until aged by about five years of operations.

A problem occurs when deNOx catalyst effectiveness is decreased because desired operating flexibility which would otherwise permit use of all available fuels is reduced, and less refinery butane and waste gas can be burned without risk of exceeding permitted emissions limits. In addition, steam and power outputs may be reduced if emissions limits are reached. Each unit must remain in compliance with NOx emission limitations, as set by the applicable permit to operate, or face fines or other penalties. If NOx removal performance of the units is decreased significantly, permit compliance cannot be maintained.

As one operating alternative in the presence of poor deNOx catalyst performance, the cogeneration unit can be set up in a manner where additional deNOx steam is forced into the gas turbines to reduce the gas turbine outlet NOx, resulting a reduction of SCR inlet NOx load. This reduction in SCR inlet NOx concentration allows units with reduced deNOx efficiency to stay within prescribed emissions limits; however, use of additional deNOx steam in this fashion may cause a portion of the unit's combustion control system to be bypassed and, upon restoration to normal control, cause the unit to exceed normal stack concentration and/or mass emissions limitations for NOx.

SCR catalyst, which exhibits the undesired characteristic of producing nitrogen oxide by ammonia oxidation, may be replaced. Replacement catalyst is expensive and both difficult to obtain and difficult to install. Material procurement, catalyst manufacture, module assembly, packaging for shipment, transport and delivery to the cogeneration site can require more than six months of elapsed time. In addition, installation is difficult. For example, existing catalyst modules may be welded in place. These must first be removed, then the SCR reactor must be prepared to receive the replacement modules. The replacement modules are then placed in the reactor and welded together. The replacement process may require more than two weeks of downtime per unit. If replacement catalyst procurement and installation cannot be scheduled to coincide with the regular annual maintenance outage of the associated gas turbine unit, excessive unit downtime or emissions noncompliance will occur.

SUMMARY OF THE INVENTION

We have discovered that loss of NOx removal activity in a two stage oxidation/reduction catalyst system is caused by the migration of platinum from the upstream CO/ROG catalyst to the downstream SCR deNOx catalyst. We have found that low levels of platinum, when in an active state and when present on SCR deNOx catalyst, cause some of the ammonia injected for the normal SCR reaction to be oxidized to form additional NOx rather than the ammonia reacting with NOx to reduce it to molecular nitrogen. When the ammonia oxidation reaction rate becomes dominant over the SCR reaction rate, the NOx removal process becomes ineffective.

We have discovered that low level platinum deposits on deNOx catalyst, in the range of about 5 to 10 ppm result in poor deNOx efficiency and significant ammonia oxidation activity. Ammonia oxidation is an undesirable effect, because it both depletes one reactant (ammonia) and increases the other reactant (NOx). The reactions are:

SCR REACTIONS (EXAMPLE)

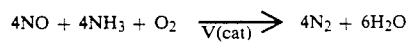

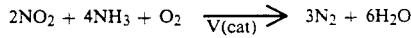

COMPETING AMMONIA OXIDATION REACTION

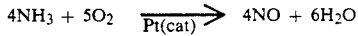

It is difficult to reduce the migration of trace amounts of platinum from the CO/ROG catalyst to the SCR catalyst. In addition, to eliminate platinum entirely from the system would require CO catalyst formulations that are platinum-free, and such are not generally commercially available. It is expensive to replace SCR catalyst contaminated with low-levels of platinum with new, uncontaminated catalyst as we have found that, even as to deNOx catalyst which contains only trace amounts of platinum contaminants, approximately 50% of the SCR catalyst must be replaced to restore adequate deNOx efficiency.

It is thus one object of this invention to provide a means of treating spent SCR system catalyst to permit system performance in compliance with air quality requirements with relatively minor impact on steam and power generation capacity and plant reliability.

We have found that platinum deposited on the catalyst support and/or plates in a commercial SCR deNOx unit apparently are deposited only on the surface of the plates and do not penetrate far into the SCR catalyst material that is deposited on the plate. We have also found that platinum can be selectively volatilized from the surface of CO/ROG catalyst, leaving rhodium and other metals behind, and subsequently condensed on the outer surface of the SCR catalyst plates, creating local areas having very high platinum concentration. The surface concentration of platinum thus is found to be relatively very high and produces oxidation results such as would be seen if the platinum concentration was much higher and uniformly distributed throughout the SCR catalyst material. In addition, the adverse activity of this surface platinum for ammonia oxidation is enhanced through exposure of the surface of the contaminated SCR catalyst to moisture.

In the prior art, it was thought that platinum metal was extremely non-volatile at the operating temperature of the CO/ROG catalyst; however, platinum volatility is enhanced in the presence of oxygen. Cogeneration gas turbine effluent flue gas streams typically contain about 11% to about 16% or more oxygen, and this is a highly oxidizing environment. Rhodium and other precious metals found on the CO/ROG catalyst can also become volatile, but we believe that it is likely that they will volatilize only under more severe conditions than that at which platinum volatilizes.

We have thus discovered a method for restoring the deNOx activity of deNOx catalyst, which may be contaminated with platinum, which method avoids purchase of new, replacement catalyst.

One embodiment of this invention is a method for treating spent SCR catalyst, which method comprises (a) contacting the spent catalyst with a solution comprising a metal salt of a metal which catalyzes the reaction of ammonia and an oxide of nitrogen to nitrogen; and, (b) heating the catalyst contacted with the solution at a calcination temperature in the presence of oxygen, preferably an oxygen-containing stream such as air. This embodiment is effective to treat a variety of spent catalysts, including spent SCR deNOX catalyst having diminished deNOx activity and which is contaminated with platinum, and the treating of the catalyst increases the NOx reduction activity of the spent deNOx catalyst. In a preferred variation of this embodiment of this invention, the catalyst contacted with the solution is dried, preferably by contact with an oxygen rich gaseous stream such as air, for at least about 10 seconds and heated to a temperature in the range of about 130° F. to about 170° F. for a period about 30 minutes to about 90 minutes before heating to the calcination temperature. The metal salt is preferably a vanadium salt; however, any salt is useful if such is a salt of any metal which catalyzes the reaction ammonia and an oxide of nitrogen to nitrogen in strong preference against catalysis of a reaction of ammonia and oxygen to an oxide of nitrogen. For example and without limitation, it is preferred that the metal salt is ammonium meta-vanadate in an oxalic acid and water solution, and more preferably, the metal salt is vanadyl sulfate. In preferred variations, the catalyst is immersed in the solution or is sprayed with the solution, and more preferably, the spent catalyst is imbrued with the solution to substantially saturate the spent catalyst with the solution. In another variation, the active metal of the catalyst is supported on a catalyst support and the catalyst is contacted with the solution and heated in the presence of oxygen to a calcination temperature at which the metal salt is decomposed to form an oxide of the metal and the metal oxide is bonded to the catalyst support. In a preferred variation of this embodiment of this invention, the catalyst contacted with the solution is heated to a calcination temperature less than about 450° F. in the presence of oxygen, and more preferably in the presence of air. Preferred calcination temperatures are in the range of about 225° F. to about 300° F.; however, higher temperatures may be used. Another embodiment of this invention is a SCR catalyst treated in accordance with the foregoing embodiment.

Another embodiment of this invention is a method to restore the catalytic activity of a SCR catalyst, supported on a catalyst support and contaminated with platinum, to enhance catalytic reduction of oxides of nitrogen to nitrogen by the catalyst, which method comprises (a) contacting the spent catalyst with a solution comprising a metal salt of a metal which catalyzes the reaction of ammonia and an oxide of nitrogen to nitrogen; (b) heating the catalyst contacted with the solution at a calcination temperature in the presence of oxygen to a calcination temperature at which the metal salt is decomposed to form an oxide of the metal and the metal oxide is bonded to the catalyst support, to form a calcined catalyst; and (c) contacting the calcined catalyst with a SCR flue gas stream at a temperature in the range of about 450° F. to about 750° F. In one preferred variation of this embodiment of this invention, the catalyst contacted with the solution is dried, preferably by contact with a gaseous stream, for example preferably by drying with an oxygen-containing gas such as air, for at least about 10 seconds and heated to a temperature in the range of about 130° F. to about 170° F. for a period about 30 minutes to about 90 minutes before heating to the calcination temperature. As with the previous embodiment, in this embodiment, the metal salt is a preferably vanadium salt; however, any salt is useful if such is a salt of any metal which catalyzes the reaction ammonia and an oxide of nitrogen to nitrogen in strong preference against catalysis of a reaction of ammonia and oxygen to an oxide of nitrogen. It is preferred that the metal salt is ammonium meta-vanadate in oxalic acid and water, and more preferably, the metal salt is vanadyl sulfate. The catalyst can be sprayed with the solution. In preferred variations, the catalyst is immersed in the solution, and more preferably, the spent catalyst is imbrued with the solution to substantially saturate the spent catalyst with the solution. In a preferred variation of this embodiment of this invention, the catalyst contacted with the solution is heated to a calcination temperature less than about 450° F in the presence of oxygen rich gas, and more preferably in the presence of air. Preferred calcination temperatures are in the range of about 225° F. to about 300° F.; however, higher temperatures may be used. Another embodiment of this invention is a SCR catalyst treated in accordance with the foregoing embodiment.

In still another embodiment of this invention, a method is provided for treating catalyst having a surface area and contaminated with platinum, which method comprises (a) heating water to a temperature in the range of about 110° F. to about 130° F. to form mildly warm water; (b) adding oxalic acid to the warm water; (c) adding ammonium meta-vanadate to the warm water to form a solution of ammonium meta-vanadate in oxalic acid and water, and maintaining the solution at a temperature wherein the ammonium meta-vanadate is dissolved; (d) contacting the catalyst contaminated with platinum with the solution of ammonium meta-vanadate in oxalic acid and water for a period of time sufficient to permit the solution to contact at least a substantial portion of the surface area of the catalyst; (e) drying the catalyst of step d. with air for at least ten seconds; (f) heating the catalyst of step e. to a temperature in the range of about 130° F. to about 170° F. for a period about 30 minutes to about 90 minutes to liberate ammonia from the meta-vanadate and CO from the oxalic acid; and, (g) heating the catalyst of step f. to a calcination temperature in the range of about 225° F. to 300° F. In another embodiment of this invention, a SCR catalyst treated in accordance with the foregoing embodiment is provided. In a variation where vanadyl sulfate is employed, $SO_2$ can be produced from the vanadyl sulfate.

DESCRIPTION OF PREFERRED EMBODIMENTS

This invention is further illustrated with reference to the drawings, for purpose of illustration of preferred embodiments, it being understood that this invention is not limited thereto.

Figure 1:
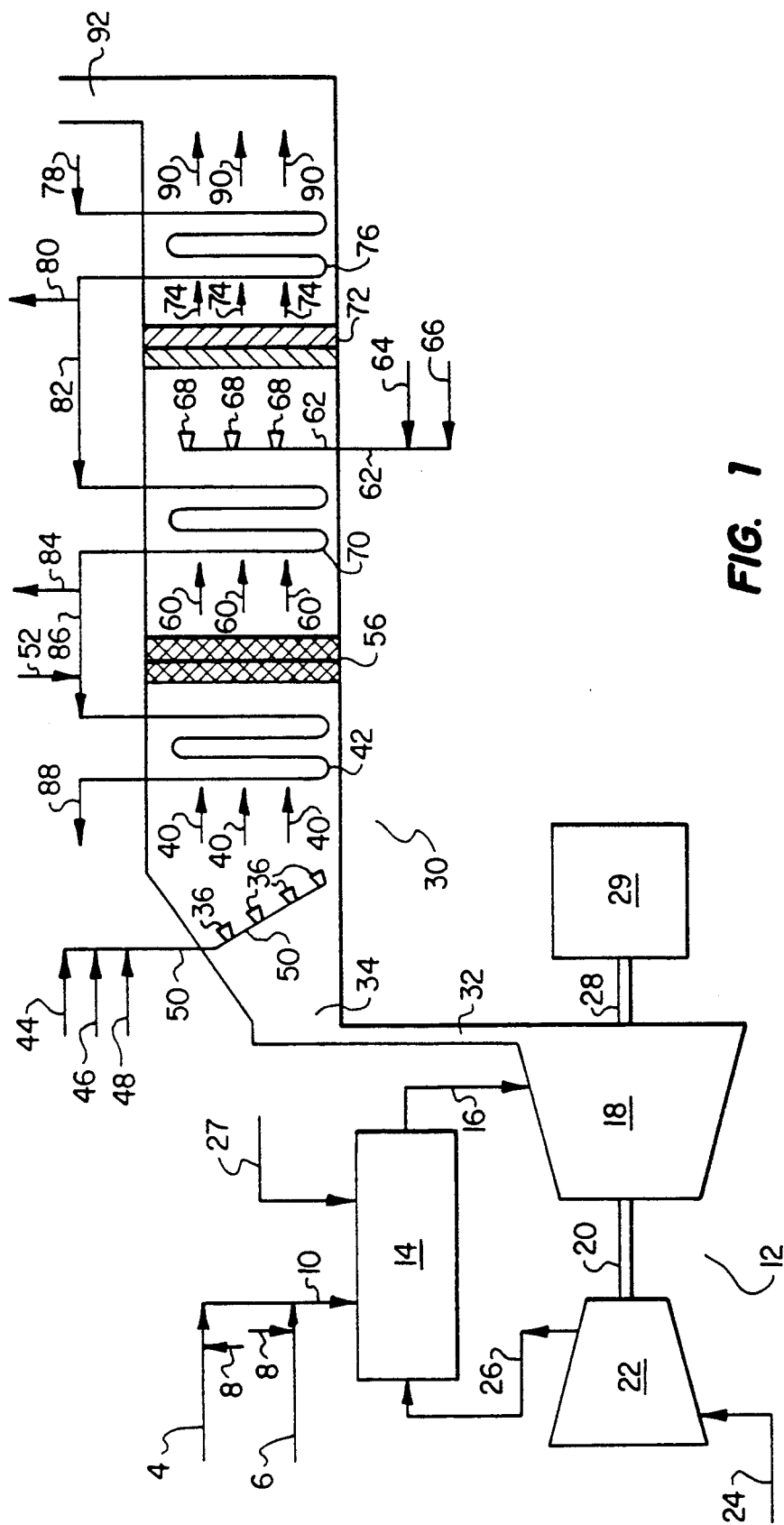
FIG. 1 is a schematic representation of a prior art cogeneration heat recovery steam generator, showing placement of CO/ROG catalyst, ammonia injection, and deNOx catalyst.

FIG. 1 is an illustrative representation of a cogeneration process shown generally as 12. Natural gas 4, liquified petroleum gas 6 which may consist predominantly of butane 6, and/or refinery fuel gas 8, or combinations thereof, are selected as primary, secondary and tertiary fuel sources 10 for burning in combustion section 14 of gas turbine 12 to produce hot gases 16 which are directed to turbine section 18 of gas turbine 12. Gas turbine 12 turbine section 18 drives shaft 20, which drives compressor air inlet section air compressor 22 which compresses input air 24 to produce compressed air 26 as air feed to combustion section 14 of gas turbine 12. Gas turbine 12 turbine section 18 drives shaft 28 of generator 29 to produce electricity. Steam 27 may be injected into combustion section 14 for NOx control. From gas turbine 12 turbine section 18, exhaust gas 32 containing combustion products and byproducts, such as carbon monoxide and NOx, and unburned reactive organic gases, such as unburned hydrocarbons, is passed to heat recovery steam generator 30 input section 34 and in contact with duct burners 36. Duct burners 36 have a primary, secondary and fuel source, natural gas 44, liquified petroleum gas 46 and refinery fuel gas 48 via feed line 50 to duct burners 36. The duct burners 36 can be used to adjust flue gas 40 temperature, which contacts superheater unit 42. Superheater unit 42 has as input steam 86 from downstream heat recovery steam generator 30 boiler and economizer zones 70 and 76, and attemperator water 52 is used to adjust temperature of high pressure superheated steam 88. The oxidizer 56 is positioned downstream from the superheater 42 and converts carbon monoxide and unburned reactive organic gases in the flue gas 40 to reduced CO/ROG flue gas at point 60. Typical flue gas 40 temperatures at the oxidizer catalyst 56 are preferably in the range of 740° F. to about 1150° F. Vaporized ammonia 64 is passed via conduit 62, either alone or admixed with air 66, to ammonia injection nozzles 68. Ammonia injection nozzles 68 can either be upstream or nested within or downstream of high pressure economizer 70, but are placed upstream of selective catalytic reduction catalyst 72, which catalyst 72 converts ammonia 64 and flue gas 60 NOx to nitrogen and water. One or more other economizers 76 are used to convert feed water 78 to steam 80 and 82, by contact with hot flue gases 74, for either passage out of heat recovery steam generator 30 as product steam 80 or passage via conduit 82 to other economizer 70 and superheater 42, to produce intermediate product steam 84 or superheated steam 88. In the prior art, SCR 72 zone operations are preferably conducted at about 550° F. to about 775° F. For this reason, the SCR catalyst 72 is located preferably between the superheater 42 and the last economizer section 76 within heat recovery steam generator 30.

Oxidizer 56 and SCR 72 treated gases at point 90 are passed via stack 92 from the heat recovery steam generator 30.

Oxidizer catalyst 56 is reported in the art to have an expected life of 2 to 4 years, as described in "Integrating a Cogeneration Plant into a Refinery", by H. J. Kraus, et al., *Energy Progress* (Vol. 8, No. 3), September 1988. The same reference reports that, with a flue gas flowrate 40 in excess of 1,100,000 pounds per hour, the pressure drop across prior art CO oxidizer catalyst 56 having a honeycomb catalyst shape was 41 mm of water. And such reference reported that prior art oxidizers 56 are known to have CO oxidation efficiencies of 90% or greater, being able to reduce CO at the CO oxidizer 56 inlet from 20 parts per million to 2 about parts per million in exit gas stream 90 as final flue gas 92, and that SCR NOx removal efficiency was approximately 90% reducing NOx in flue gas 60 upstream of the SCR catalyst 72 from about 57.0 parts per million to 5.5 parts per million in stack 90 exit gas 92. Reported pressure drop across the SCR 72 for flue gas 60 flowrate in excess of 1,100,000 pounds per hour was in the range of 35 mm of water and the SCR catalyst 72 was reported to have an expected life of 2 to 4 years.

Figure 2:
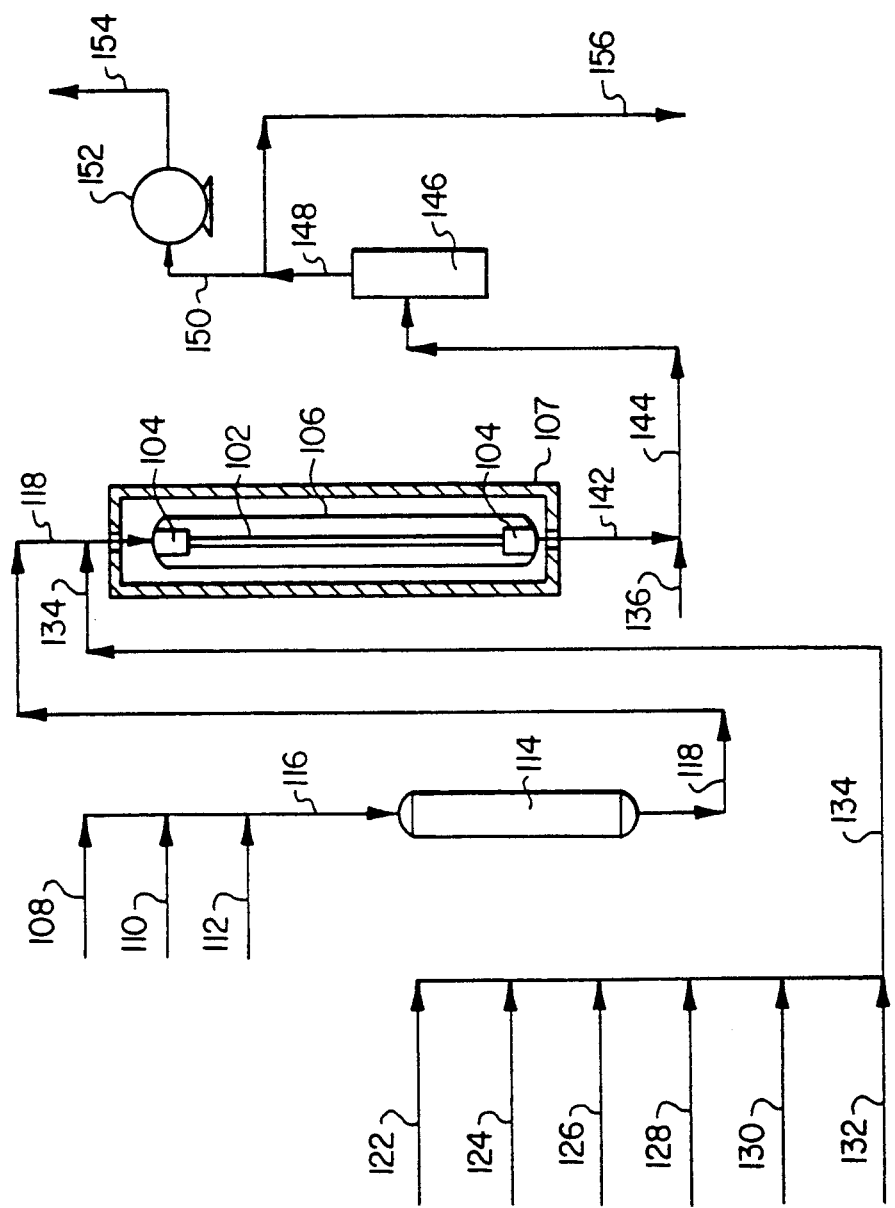
FIG. 2 is a schematic representation of an oxidation and a SCR test apparatus used in the manner described in Examples 1 and 2.

FIG. 2 is a schematic representation of oxidation and SCR test apparatus used in the manner described further in Examples 1 and 2, below, for comparing NOx reduction effectiveness of contaminated SCR catalyst with catalyst treated in accordance with this invention. Catalyst test sample 102 was inserted into a quartz sample holder 104 and placed inside a quartz reactor 106. The reactor 106 was placed inside a furnace 107. Air feed line 108, nitrogen feed line 110 and water feed line 112 were connected to preheat furnace 114 via conduit 116. Preheat furnace 114 was used to raise water 112 to the vapor phase, and preheat furnace 114 effluent line 118 to reactor 106 was heat-traced to maintain water 112 in the vapor phase to avoid condensation of moisture ahead of the reactor 106, which may cause reactor 106 damage due to rapid vaporization and expansion of water 112. Test gas streams used for testing included ethane 122, CO 124, $CO_2$ 126, ammonia 128, NO 130 and $SO_2$ 132. The gases in streams 122, 124, 128, 130 and 132 were blended with nitrogen such that nitrogen was the major component. That is, ethane, CO, ammonia, NO and $SO_2$ were introduced from gas cylinders containing about 0.1 vol % of these gases with the balance (99.9 vol %) being nitrogen. $CO_2$ was introduced as 100% $CO_2$. A separate Brooks' mass flow controller (not shown) was used with each of the gas streams to measure the flow for each of the gas streams, and control flowmeters (not shown) were used to set and regulate the flow of such test gas streams which were directed via conduit 134 to reactor 106 or were directed via conduit 136 to bypass the reactor 106. Reactor 106 effluent 142, or the test feed gas 134 if the reactor 106 is bypassed, is passed via conduit 144 to reactor 106 effluent refrigeration system 146 water removal. Refrigeration system 146 effluent 148 was passed either via conduit 150 to dry test meter 152 and vented via conduit 154 or was passed via conduit 156 to process analyzers (not shown).

EXAMPLE 1

Catalyst pieces were treated with an ammonium meta-vanadate solution and calcined at different temperatures, and the activities of such pieces were tested to compare the effect of calcination temperature on NOx reduction, at several different operating temperatures.

An ammonium meta-vanadate solution was prepared by the following steps. A balance and a stirring hot plate were set up inside a vented hood. 400 cc's (400 gms) of distilled water were heated to a temperature in the range of about 110° F. to about 130° F. in a 500 cc Pyrex beaker. 87.26 gms oxalic acid were added while stirring the heated water. 57.51 gms ammonium meta-vanadate were added slowly while maintaining the stirring. A dark-blue colored solution (10.6 w % ammonium meta-vanadate) resulted, which solution was stirred while being maintained at a temperature in the range of about 110° F. to about 130° F. until essentially all solids have dissolved. Thereafter, while still hot, the liquid 10.6 w % ammonium meta-vanadate, in oxalic acid/distilled water, was poured off into a glass storage bottle and stored in a secured, chemical storage area until used for catalyst treatment.

Catalyst pieces to be treated by the vanadium solution were placed in a quartz holder suitable for supporting the catalyst for later immersion, followed by calcination. To a Pyrex dish to be used for dipping the catalyst, approximately one liter of vanadium solution was added. A hot plate was used to warm the dish as necessary to bring the ammonium meta-vanadate/oxalic acid solution to a temperature in the range of about 110° F. to about 130° F. to re-dissolve any crystallized material. The quartz holder containing the catalyst pieces was lowered into the dish containing the vanadium solution. After about one minute soaking time, the quartz holder and catalyst pieces were removed, and then the catalyst pieces were air dried for about 60 seconds at ambient temperature in preparation for the calcination step.

As soon as practical after dipping and air drying, the catalyst was placed into a muffle furnace for heating while being supported by the quartz holder. The oven temperature was ramped up from ambient at the rate of about 10° F./min. to an initial warming temperature in the range of about 140° F. to about 160° F., and the temperature was held at such for about 30 minutes. At such temperature, ammonium meta-vanadate liberates ammonia and oxalic acid liberates CO.

Thereafter, the oven temperature was ramped up temperature at 10° F./min. until a first calcination temperature in the range of about 240° F. to 260° F. was reached. The oven was then held at the desired calcination temperature for a period of about 2 hours. Thereafter, the furnace heat source was turned off, and the catalyst was allowed to cool to room temperature to avoid contact with volatile materials. The catalyst so treated and calcined was stored in a closed, clean and dry container.

For test and comparison purposes, other catalyst pieces were treated with solution and then were calcined at two other temperatures: (i) 650° F. and (ii) 1000° F., in addition to the initial 250° F. calcination.

The activities of the catalyst calcined at the various temperatures were then compared for NOx reduction effectiveness. Reference is made to FIG. 2, discussed above, and descriptive numerals used in this discussion of Example 1 have the same meaning as assigned in the description of FIG. 2. For activity testing, a catalyst test piece 102 (20×100 mm; 6.2 sq. in. total area, both sides) was inserted into a quartz sample holder 104, which was placed inside a one-inch I.D. quartz reactor 106. Each catalyst piece 102 tested had a dimension, in inches, of 0.787×3.94×0.033. If the catalyst test piece 102 was curved, it was first straightened to remove much, if not all, of the curvature. Each catalyst test piece 102 tested was centered at substantially equidistance from each of the two parallel sides of the reactor 106 and was pushed all the way down into the catalyst holder 104 which has a cross-sectional dimension of 0.236×0.846 inches and is designed such that the gas flow 118 and 134 was forced into a rectangular reactor 106 space (approximately 6 mm×21.5 mm and about 120 mm long) in which the catalyst 102 was contained and that no gas 118 or 134 bypassed this space.

The reactor 106 was then closed, but not sealed, as the reactor 106 is designed to permit gas 118 and 134 flow into the reactor 106 and in contact with the catalyst test piece 106. Feed lines for air 108, nitrogen 110 and water 112 were connected to the reactor 106 preheat heat furnace 114.

Flowmeters were installed on the gas feed lines to control the rate of flow of air 108, nitrogen 110, ammonia 128/nitrogen 110 ratio and NO 130/nitrogen 110 ration, and a flowmeter was installed on the carbon dioxide 126 line. A separate Brooks' mass flow controller was used with each of the gas streams to measure the flow for each of the gas streams. Each flow controller was factory calibrated for the particular gas it controls, as follows: (i) air 108, 0–5 SCFH and 0–100 SCFH, (ii) nitrogen 110, 0–5 SCFH and 0–50 SCFH, (iii) NH3/N2 blend 128 (or CO/N2 124 in Example 2, below, for CO 124 oxidation testing). 0–5 SCFH, (iv) CO2 126, 0–10 SCFH, (v) NO/N2 blend 130 or SO2/N2 blend 132 (see Example 2, below), 0–5 SCFH, and (vi) ethane 122/N2 110 ratio (see Example 2, below, for discussion of HC oxidation testing), 0–5 SCFH.

The reactor 106 system was then pressure tested with nitrogen 110 or air 108 and to confirm that all leaks had been eliminated. A thermocouple (not shown) was installed at the top and bottom of the reactor 106, and a NO/NOX analyzer (Rosemount NO/NOX Analyzer, not shown) was connected to the reactor 106 effluent 156.

To establish a base case, gas flows 118 and 134 were directed around the reactor 106 through bypass 136 and 144, and the following individual gas flow rates were set: (i) oxygen, (as air 108), 3 vol. %, (ii) water 112, 12 vol. %, (iii) NO 130 (with nitrogen carrier), 200 vol. ppm of total stream, (iv) ammonia 128 (with nitrogen carrier), 240 vol. ppm of total stream; (v) carbon dioxide 126, 12.0 vol. %, (vi) carbon monoxide 124, 0% (none), (vii) hydrocarbon (ethane 122), 0% (none), (viii) sulfur dioxide 132, 0% (none), and (ix) nitrogen 110, balance of approximately 85 vol. %. Thus, while the reactor 106 was bypassed, gas flow rates in SCFH were measured as: (i) air 108, 0.984 SCFH, (ii) 0.1% NO 130 (N2 carrier), 1.370 SCFH, (iii) 0.1% NH3 128 (N2 carrier), 1.650 SCFH, (iv) carbon dioxide 126, 0.824 SCFH, and (v) nitrogen 110,, balance, 1.220 SCFH, for a total gas flowrate, SCFH of 6.05 (dry). Actual rates were adjusted to account for actual gas blend concentrations in order to achieve the following conditions: (i) total gas flow rate (including water): 6.87 SCFH (60° F. Base) and (ii) total gas flow rate (water-free): 6.05 SCFH (60° F. Base). The total gas flow of 6.87 SCFH (60° F. Base), including water, is equivalent to an area velocity of 51 cubic Nm/hr/square meter of catalyst area.

The test gas composition was thus as follows:

|  | Wet Basis | Dry Basis |
| --- | --- | --- |
| NO, vppm | 200 | 227 |
| O2, % vol | 3 | 3.41 |
| CO2, % vol | 12 | 13.64 |
| H2O, % vol | 12 | 0 |
| NH3, vppm | 240 | 273 |
| N2, % v | 72.96 | 82.90 |
| NH3/NO mol ratio | 1.2 | 1.2 |

The reactor effluent refrigeration system 146 was activated prior to admitting gas flow 118 and 134 to the reactor or via conduit 156 to the analyzer.

NO concentration was first measured for the test gas composition while the reactor 106 was by-passed, and the concentration of NO in the feed was found to be in the range of about 227 vol. ppm (H2O-free).

Water was then injected, while NO was continuously monitored. The concentration of NO did not change at this point since the added water was removed by refrigeration before the effluent gases were analyzed. After the set-up was completed and the analysis of the test gas stream (reactor by-passed) was completed, test gas flow was directed through the reactor.

To begin data collection, the furnace 107, in which the reactor 106 was placed, was heated from ambient to about 572° F. at a rate of about 20° F./min.

Data was taken for each of the following test operating temperatures: (i) 572° F. (300° C.), (ii) 662° F. (350° C.), (iii) 752° F. (400° C.), and (iv) 842° F. (450° C.). To obtain the data, the reactor 106 temperature was increased in increments and maintained for test period about 20–30 minutes at each desired test temperature.

After data was taken at the highest test temperature (842° F.), the NO of the NO/N2 blend was decreased to zero, while at the same time, N2 flow was increased by an identical amount to keep the same total flowrate after eliminating NO in the feed gas. Thus, any NO measured in the reactor effluent would then be caused by ammonia (NH3) reacting with air. In order to test NH3 oxidation, the temperature of the reactor was then decreased, in increments of about 20° F./min., between test conditions for each the following temperatures and held for 20 minutes at each of the following temperatures: (i) 842° F. (450° C.), (ii) 752° F. (400° C.), (iii) 662° F. (350° C.) and (iv) 572° F. (300° C.).

EXAMPLE 2

Catalyst pieces were treated with an ammonium meta-vanadate solution and calcined at different temperatures, and the activities of such pieces were tested to compare the effect of calcination temperature on SCR activity.

An ammonium meta-vanadate solution was prepared by the method described in Example 1. Catalyst pieces were treated by dipping and calcining, as also described in Example 1, at calcination temperatures of (i) 250° F., (ii) 650° F. and (iii) 1000° F.

The SCR activities of contaminated and of the dipped and calcined catalyst were determined by deNOx conversion at various temperatures. The test procedure and apparatus were the same as described in Example 1.

Table 1 is a summary of NO conversion, at four different reactor test operating temperatures: (i) 572° F., (ii) 662° F., (iii) 752° F., and (iv) 842° F. for catalyst treated with a solution comprising a metal salt and calcined in accordance with this invention, at calcination temperatures of 250° F., 650° F. and 1000° F., respectively. Higher NO conversions indicate better catalyst activity.

TABLE 1

| Test Reactor Operating Temperature, °F. | Approximate NO Conversion, % | | | |
|---|---|---|---|---|
| | Contaminated Catalyst | Calcination Temperature of Treated and Restored Catalyst | | |
| | | 250° F. | 650° F. | 1000° F. |
| 572 | 37 | 65 | 67 | 66 |
| 662 | 56 | 71 | 73 | 70 |
| 752 | 56 | 71 | 72 | 69 |
| 842 | 37 | 59 | 61 | 56 |

Table 2 is a summary comparing the results of testing ammonia oxidation for contaminated catalyst with the same catalyst treated pursuant to this invention at four different reactor operating conditions of 572° F., 662° F., 752° F. and 842° F. Lower ammonia oxidation indicates better selectivity and hence better SCR catalyst.

TABLE 2

| Test Reactor Operating Temperature, °F. | Approximate NH$_3$ Oxidation, % | | | |
|---|---|---|---|---|
| | Contaminated Catalyst | Calcination Temperature of Treated and Restored Catalyst | | |
| | | 250° F. | 650° F. | 1000° F. |
| 572 | 0.4 | <0.1 | <0.1 | <0.1 |
| 662 | 1.3 | 0.1 | 0.1 | 0.1 |
| 752 | 4.7 | 0.3 | 0.4 | 0.6 |
| 842 | 10.1 | 3.4 | 3.4 | 4.5 |

Note that data in Tables 1 and 2 show a large beneficial effect of treating and restoring contaminated catalyst and, furthermore the surprising result that a low temperature calcination is as effective as a high temperature calcination.

While the invention has been described in conjunction with presently preferred embodiments, it is obviously not limited thereto.

What is claimed is:

1. A method of treating spent selective catalytic reduction catalyst contaminated with platinum and having a reduced efficiency of removal of oxides of nitrogen comprising:
   a. contacting said spent catalyst with a solution comprising a metal salt of a metal which catalyzes the reaction of ammonia and an oxide of nitrogen to nitrogen; and
   b. heating said catalyst contact with said solution at a calcination temperature in the presence of oxygen.

2. A method in accordance with claim 1 wherein said catalyst contacted with said solution is dried for at least about 10 seconds and heated to a temperature in the range of about 130° F. to about 170° F. for a period about 30 minutes to about 90 minutes before heating to said calcination temperature.

3. A method in accordance with claim 1 wherein said metal salt is a vanadium salt.

4. A method in accordance with claim 1 wherein said metal salt is ammonium meta-vanadate in an oxalic acid and water solution.

5. A method in accordance with claim 1 wherein said metal salt is vanadyl sulfate.

6. A method in accordance with claim 1 wherein said catalyst is immersed into said solution.

7. A method in accordance with claim 1 wherein said catalyst is sprayed with said solution.

8. A method in accordance with claim 1 wherein said spent catalyst is imbrued with said solution to substantially saturate said spent catalyst with said solution.

9. A method in accordance with claim 1 wherein said catalyst contacted with said solution is supported on a catalyst support, and said catalyst contacted with said solution is heated in the presence of oxygen to a calcination temperature at which said metal salt is decomposed to form an oxide of said metal, and said metal oxide is bonded to said catalyst support.

10. A method in accordance with claim 1 wherein said catalyst contacted with said solution is heated to a calcination temperature less than about 450° F. in the presence of oxygen.

11. A method in accordance with claim 1 wherein said catalyst contacted with said solution is heated to a calcination temperature in the range of about 225° F. to about 300° F. in the presence of oxygen.

12. A method in accordance with claim 1 wherein said spent catalyst is a catalyst effective to promote the reduction of oxides of nitrogen to nitrogen having diminished activity for reduction of oxides of nitrogen and is contaminated with platinum, and said treating of said catalyst increases said activity for reduction of oxides of nitrogen to nitrogen of said spent catalyst.

13. A method for restoring the catalytic activity of a selective catalytic reduction catalyst, supported on a catalyst support and contaminated with platinum, to enhance catalytic reduction of oxides of nitrogen to nitrogen by said catalyst, said method comprising:
   a. contacting said spent catalyst with a solution comprising a metal salt of a metal which catalyzes the reaction of ammonia and an oxide of nitrogen to nitrogen;
   b. heating said catalyst contacted with said solution at a calcination temperature in the presence of oxygen to a calcination temperature at which said metal salt is decomposed to form an oxide of said metal, and said metal oxide is bonded to said catalyst support to form a calcined catalyst; and,
   c. contacting said calcined catalyst with a SCR flue gas stream at a temperature in the range of about 450° F. to about 750° F.

14. A method in accordance with claim 13 wherein said catalyst contacted with said solution is dried for at least about 10 seconds and heated to a temperature in the range of about 130° F. to about 170° F. for a period about 30 minutes to about 90 minutes before heating to said calcination temperature.

15. A method in accordance with claim 13 wherein said metal salt is a vanadium salt.

16. A method in accordance with claim 13 wherein said metal salt is ammonium meta-vanadate in a oxalic acid and water solution.

17. A method in accordance with claim 13 wherein said metal salt is vanadyl sulfate.

18. A method in accordance with claim 13 wherein said catalyst is immersed into said solution.

19. A method in accordance with claim 13 wherein said catalyst is sprayed with said solution.

20. A method in accordance with claim 13 wherein said spent catalyst is imbrued with said solution to substantially saturate said spent catalyst with said solution.

21. A method in accordance with claim 13 wherein said catalyst contacted with said solution is heated to a calcination temperature less than about 450° F. in the presence of oxygen.

22. A method in accordance with claim 1 wherein said catalyst contacted with said solution is heated to a calcination temperature in the range of about 225° F. to about 300° F. in the presence of oxygen.

23. A method of treating catalyst having a surface area and contaminated with platinum, said method comprising:
 a. heating water to a temperature in the range of about 110° F. to about 130° F. to form mildly warm water;
 b. adding oxalic acid to said warm water;
 c. adding ammonium meta-vanadate to said warm water to form a solution of ammonium meta-vanadate in oxalic acid and water and maintaining said solution at a temperature wherein said ammonium meta-vanadate is dissolved;
 d. contacting said catalyst contaminated with platinum with said solution of ammonium meta-vanadate in oxalic acid and water for a period of time sufficient to permit said solution to contact at least a substantial portion of said surface area of said catalyst;
 e. drying said catalyst of step d. with air for at least ten seconds;
 f. heating said catalyst of step e. to a temperature in the range of about 130° F. to about 170° F. for a period about 30 minutes to about 90 minutes to liberate ammonia from said meta-vanadate, CO from said oxalic acid and $SO^2$ from vanadyl sulfate; and
 g. heating said catalyst of step f. to a calcination temperature in the range of about 225° F. to 300° F.

24. A selective catalytic reduction catalyst treated in accordance with claim 3.

25. A selective catalytic reduction catalyst treated in accordance with claim 15.

26. A selective catalytic reduction catalyst treated in accordance with claim 23.

* * * * *